Sept. 6, 1932.  J. D. TUCKER  1,876,104
STEERING MECHANISM
Filed Nov. 29, 1930  3 Sheets-Sheet 1
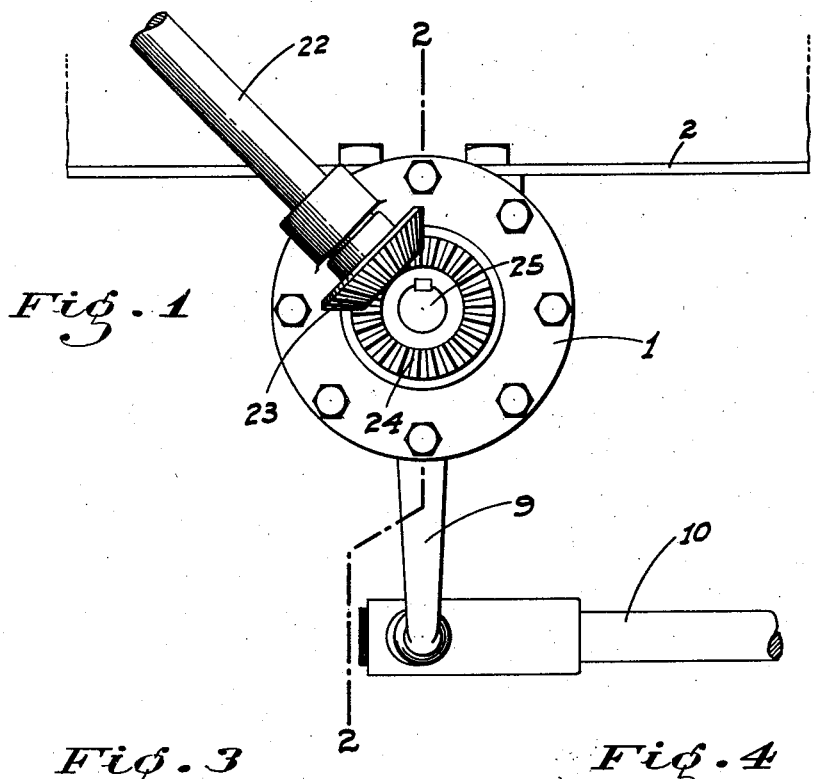
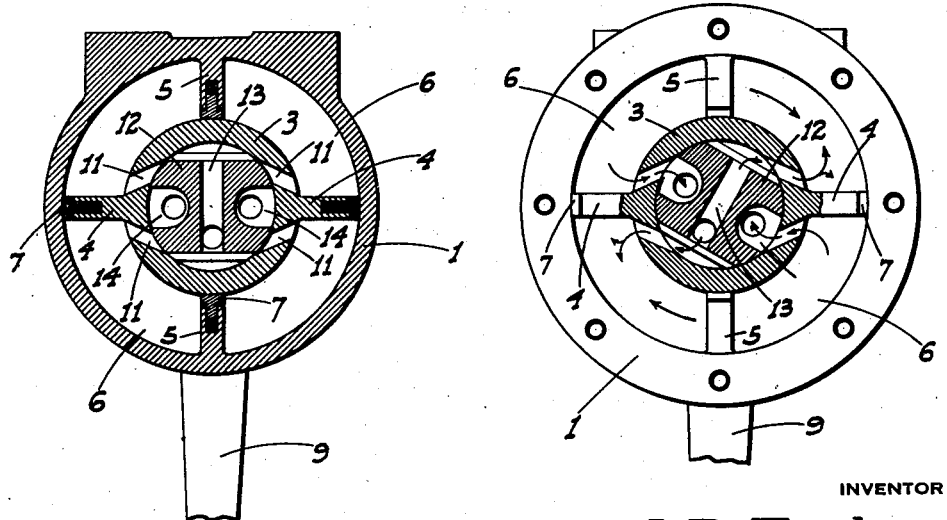
INVENTOR
J. D. Tucker
BY
ATTORNEY

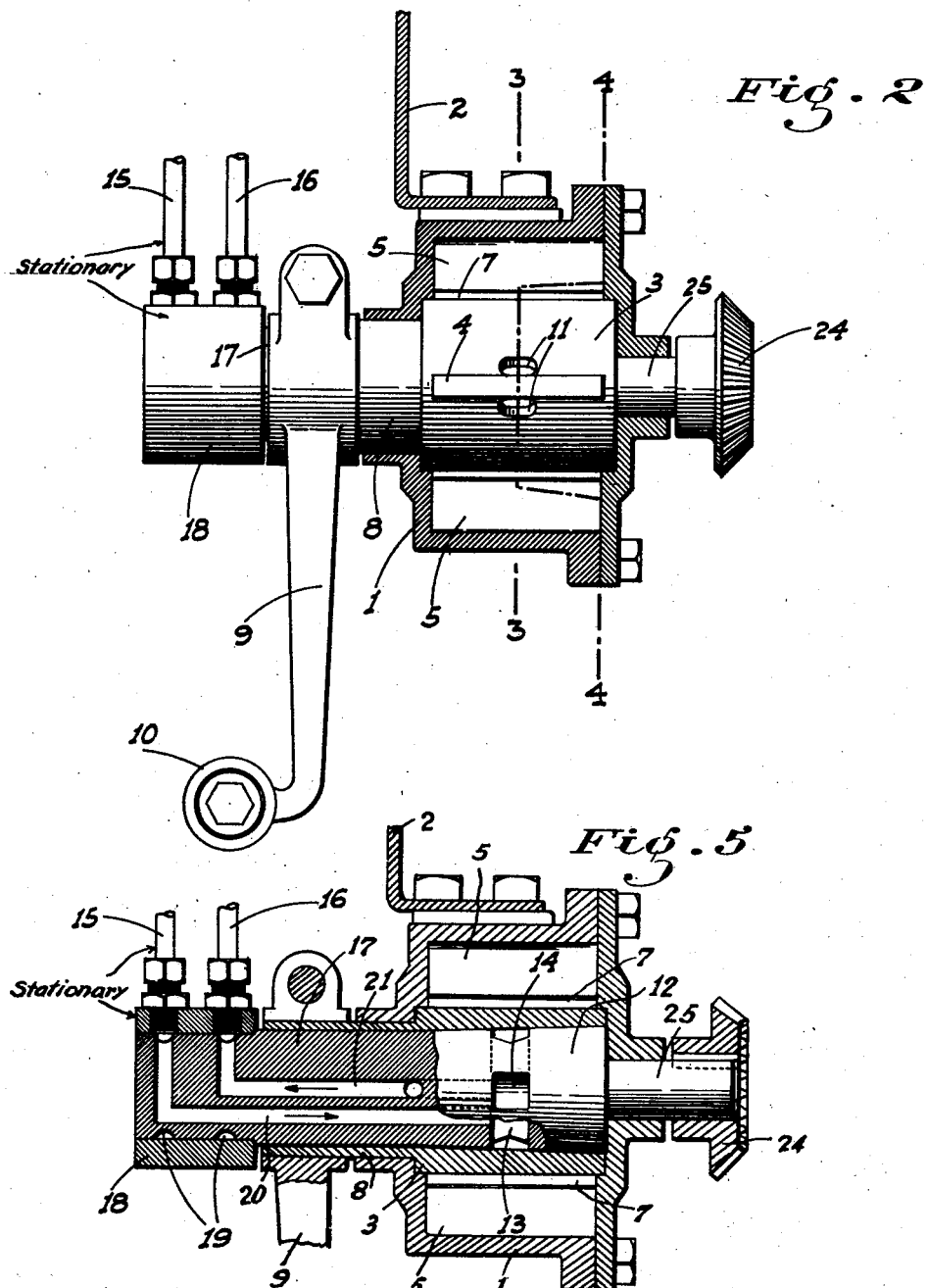

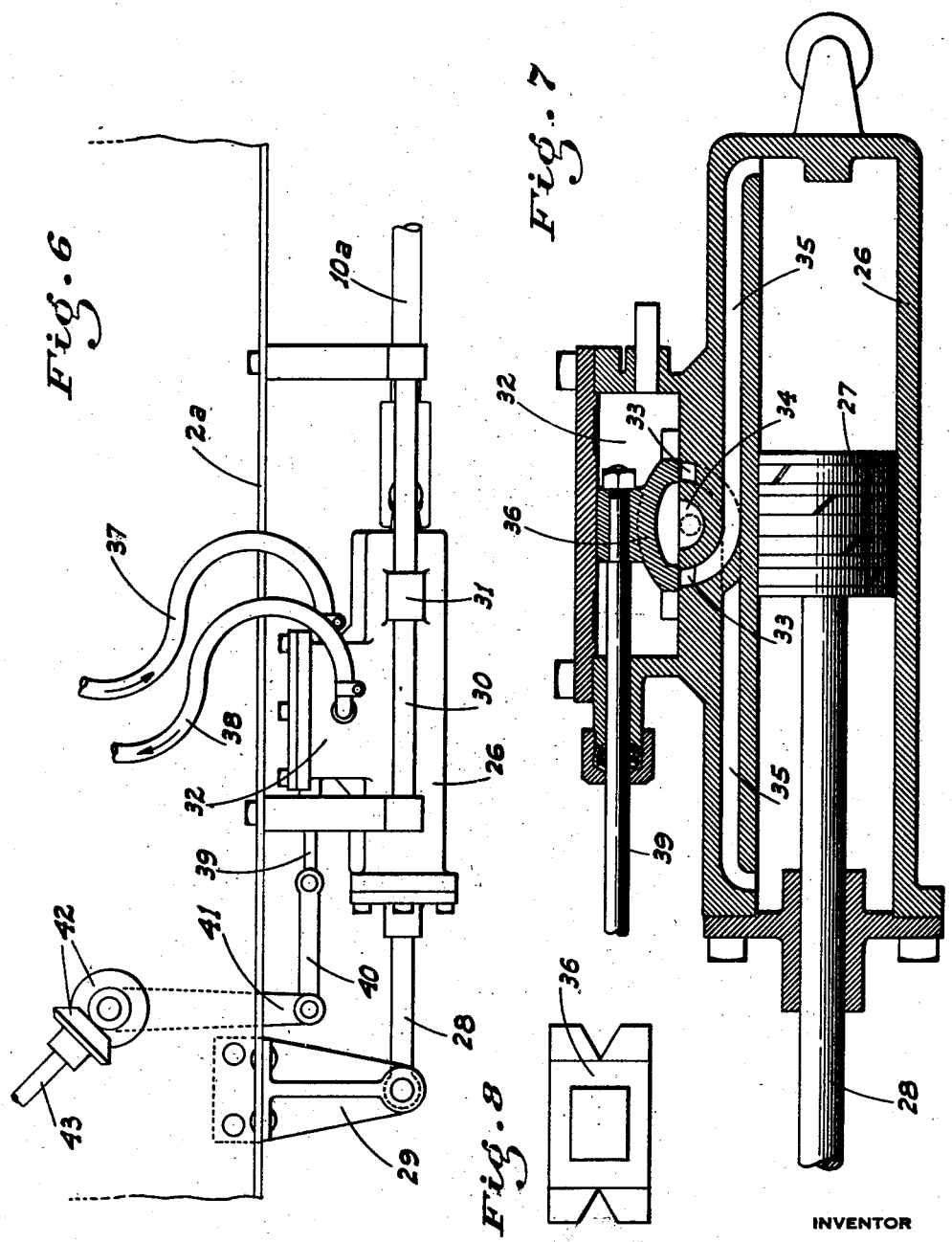

Patented Sept. 6, 1932

1,876,104

UNITED STATES PATENT OFFICE

JESSE D. TUCKER, OF NORTH SACRAMENTO, CALIFORNIA, ASSIGNOR TO TUCKER-GILMORE MFG. COMPANY, OF NORTH SACRAMENTO, CALIFORNIA, A CORPORATION OF CALIFORNIA

STEERING MECHANISM

Application filed November 29, 1930. Serial No. 499,119.

This invention relates to steering mechanisms for land and water vehicles of all kinds; being shown in its present embodiment as applied to an occupant steered land vehicle, such as an automobile.

The principal object of my invention is to provide a hydraulic or fluid actuated and fluid checked mechanism interposed between the steering wheel or similar hand controlled member and the wheels of the vehicle, and arranged so that all the power necessary to turn the wheels to any desired extent and under any conditions is obtained by hydraulic pressure with the manipulation of the hand wheel. Steering at all times is therefore facilitated and is accomplished with no manual effort; and the structure is particularly efficacious for turning wheels when the car is parked, or for heavy busses, trucks, or tractors in which the present form of steering mechanism places a continuous physical strain on the operator.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is an end elevation of one form of the mechanism.

Fig. 2 is a side or longitudinal elevation of the mechanism, with the exterior casing in section as on the line 2—2 of Fig. 1.

Fig. 3 is a cross section on the line 3—3 of Fig. 2 with the valve plug in its normal or neutral position.

Fig. 4 is a cross section on the line 4—4 of Fig. 2 showing the plug turned to a wide open position.

Fig. 5 is a longitudinal section of the structure on the line 2—2 of Fig. 1, with the plug in the position shown in Fig. 3.

Fig. 6 is a side view of a modified form of steering mechanism.

Fig. 7 is a longitudinal section of the power cylinder and control valve of such mechanism.

Fig. 8 is a top plan view of a slide valve.

Referring now more particularly to the characters of reference on the drawings, and particularly at present to Figs. 1 to 5, the numeral 1 denotes a cylindrical housing closed on both ends and adapted to be rigidly secured to the frame 2 of the vehicle so that its axis extends transversely of the vehicle. Turning with a running fit in the housing concentric therewith is a tubular rotor 3 which is smaller than the bore of the housing and has a pair of opposed vanes 4 projecting radially therefrom to engage the end walls and bore of the housing. Similar vanes 5 extend radially from the housing to the rotor, these vanes being normally arranged in diametrally opposed relation to the vanes 4, when the wheels of the car are facing straight ahead, and permitting rotation of the rotor through an arc of substantially 90 degrees in either direction. Four separate pressure-tight chambers 6 are therefore provided between the rotor and the housing, the proper pressure tight fit being insured by suitable packing or compression strips 7 mounted with and extending along the free edges of the vanes. At one end the rotor has a tubular extension 8 projecting through and beyond the adjacent end of the housing and to which a depending arm 9 is secured. The actual reach or steering rod 10 of the vehicle steering mechanism is connected to the lower end of this arm.

Ports 11 are drilled through the rotor from both sides of both of the vanes 4. The rotor is taper-bored, and turnably fitted therein is a correspondingly shaped valve plug 12. This plug has a transverse passage 13 extending therethrough and opposed transversely spaced pockets 14 arranged on opposite sides of the passage 13 but in transverse alinement therewith. The passage and pockets are disposed relative to the ports so that when the plug is in its neutral or normal position all the parts are practically closed. However, the opposite ends of the passage 13 may be arranged so that there is a slight bleeding of the fluid from said passage into the chambers 6 even when the plug is in its neutral position, thus maintaining the structure under constant fluid pressure and preventing the steerable parts connected thereto from deviation from a set position. This feature would also make the movement of such parts very sensitive, since an extremely slight rotation of the plug is sufficient to effect a definite steering movement. When the plug is turned a certain distance one of the diagonally opposed pairs of ports communicates with the opposite ends of the passage 13, while the other pair of ports communicate with the opposed pockets, as shown in Fig. 4. The port 4 is connected to a pressure pipe 15, while the pockets are connected to a return pipe 16. The necessary connections may be done in various ways, but in the present instance this is accomplished as follows:

The plug has an extension 17 projecting through and beyond the rotor extension 8, and at its outer end is closely but turnably engaged by a sleeve 18 in which the adjacent ends of the pipes 15 and 16 are secured in longitudinal relation. The periphery of the plug is provided with circumferential grooves 19 to register with said adjacent ends of the pipes; passages 20 and 21 in the plug leading from the corresponding grooves to the passage 13 and the pockets 14 respectively The pipes 15 and 16 are of course connected to any suitable pump for producing hydraulic pressure, which pump is operated by the engine and/or the driveshaft of the vehicle so as to maintain said pressure active at all times.

The plug is rotated by the driver of the vehicle from a member which may for the sake of convention simulate and occupy the same position as the present steering wheel, and from which a column or shaft 22 depends. On the lower end of this column is a gear 23 meshing with a gear 24 fixed on a spindle 25 which is formed on the end of the plug opposite the sleeve 18, and of course outside the housing. I have shown the gear ratio as being one to one, but any other desired gear ratio which may be found better may of course be employed.

In operation the rotor and all the passages and pipes are of course filled with a liquid such as oil under pressure. If the plug is turned any appreciable extent from its normal position such liquid will flow from the pipe 15 through the passage 20 to the passage 13 and thence through the diagonally opposed ones of the ports 11 into the corresponding chambers 6. At the same time the liquid from the other chambers will be returned to the pipe 16 through the other ports 11, the pockets 14 and the passage 21. The liquid will act on the movable rotor vanes to turn said rotor, and will consequently turn the arm 9 through a certain arc to effect a turning of the wheels of the vehicle through the rod 10 and connected parts. Owing to the above arrangement of the ports and passages, and the consequent direction of turning of the rotor, the latter will turn in the same direction as the plug is turned. Therefore with a turning of the plug a certain distance the rotor will only turn a corresponding distance before the ports become automatically closed. A further turning of the plug in the same direction will cause a corresponding amount of rotation to be imparted to the rotor in the same direction, and so on until the rotor can turn no further on account of the engagement of the movable and stationary vanes with each other. Such movement however is sufficient to enable the wheels to be turned to their limit to the right or left. The wheels therefore turn to the extent that the plug is turned and no more, and said wheels and the rotor will remain in such turned position until the plug is rotated in the opposite direction. This is because, as will be obvious, if all the chamber ports are closed there can be no circulation of liquid in any direction and hence the rotor cannot turn. The pressure in the feed pipe is preferably somewhat high so that the action will be sensitive and the wheels will be turned as quickly as the plug is turned.

In Figs. 6 to 8 I have shown another type of apparatus operated on the same principle as the above and to the same effect but differently constructed. In this apparatus I provide a horizontal power cylinder 26 having a piston 27 whose rod 28 projects from one end of the cylinder and is anchored to a bracket 29 depending from the frame 2a of the vehicle. The opposite end of the cylinder is alined with and directly connected to the reach or steering rod 10a so that the cylinder rather than the piston moves. The cylinder is supported in a horizontal position not only by the piston rod but by a guide rod 30 supported from the frame 2a and slidably engaged by an eye 31 on the side of the cylinder.

Formed with the cylinder is a valve chamber 32 in the bottom of which are longitudinally spaced intake ports 33 and an exhaust port 34 therebetween. Passages 35 lead from the ports 33 to the opposite end of the cylinder in crossing relation to each other, or so that the passage from the forward port leads to the rear end of the cylinder and vice versa. A slide valve 36 of common form such as is used in steam engines is mounted in the valve chamber so as to provide communication between either end of the cylinder and the valve chamber, and between the other end of the cylinder and the exhaust port selectively. In the normal or neutral position of the slide valve both intake ports are closed. The port closing ends of the slide valve are preferably longitudinally V-notched, as shown in Fig. 8, so that a very sensitive opening of the ports and control of the liquid will be had. The valve chamber is connected to a source of pressure by a flexible tube 37, while a similar tube 38 leads from the exhaust port. These tubes are of course arranged so as to permit of the necessary longitudinal movement of the cylinder in either direction from a normal position.

A rod 39 is connected to the slide valve and leads from one end of the valve chamber parallel to the piston rod and on its outer end is connected by a link 40 to the lower end of a pivoted arm 41 mounted on the frame 2a. This arm is connected by gearing 42 with a steering column or control shaft 43 so that the valve rod may be thereby moved in one direction or the other.

Owing to the direction of the passage 35 relative to the corresponding ports 33 and the slide valve, it will be seen that as either port is opened by the movement of the valve the cylinder moves in the same direction as said valve. Therefore when the cylinder has moved an amount equal to the extent of opening of the valve the ports will be again closed and the cylinder will remain in that position. It will therefore be seen that as far as the operation of the structure is concerned it is identical with the first described type. The length of the cylinder of course is such as to permit of the full throw of the reach rod, as is necessary to move the wheels through their full limit of swinging from one side to the other.

From the foregoing description it will be readily seen that I have produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A steering mechanism for a motor comprising a cylindrical housing adapted to be mounted on a side frame of the vehicle so as to extend transversely thereof, a tubular rotor turnably mounted in the housing and projecting beyond one end of the same, a steering arm secured to and depending from said projecting end of the rotor, a valve plug turnably mounted in the rotor and projecting beyond both ends of the rotor and housing, a gear on one end of the plug, a hand actuated mechanism connected to said gear, a collar relatively turnable on the other end of the plug, separated liquid conduits connected to the collar and communicating with the periphery of the plug, passages in the plug extending from said conduits to the rotor, and means formed with the rotor and housing to permit of a circulation of liquid through the passages and housing when the plug is turned from a predetermined neutral position and cause the rotor to be turned.

2. A steering mechanism for a motor comprising a cylindrical housing adapted to be mounted on a side frame of the vehicle so as to extend transversely thereof, a tubular rotor turnably mounted in the housing and projecting beyond one end of the same, a steering arm secured to and depending from said projecting end of the rotor, means to impart rotation to the rotor by liquid pressure fed to the housing about the rotor and means to control the feeding of liquid pressure to the housing comprising a valve plug turnably mounted in the rotor and projecting beyond both ends of the same, means applied to one end of the plug to turn the same by hand, liquid passages in the plug extending from the rotor to the periphery of the plug at one end thereof, and stationary liquid conduits in communication with said peripheral ends of the passages.

3. A steering mechanism comprising a fixed cylindrical housing, a relatively small tubular rotor turnably mounted therein and concentric therewith, a steering connection applied to one end of the rotor outwardly of the housing and extending from the inner wall of the same to the periphery of the rotor, opposed vanes projecting outwardly from the rotor between the housing vanes and extending to the wall of the housing, ports through the rotor on both sides of the vanes thereof, a hand actuated valve plug turnably mounted in the rotor, opposed pockets in the plug to communicate with opposed ones of said ports simultaneously, a passage extending across the plug between the pockets and arranged at its opposite ends to communicate with the other opposed rotor ports alternately, a passage in the plug communicating at one end with both pockets and at the other end extending to the periphery of the plug adjacent one end, said end being beyond the rotor and housing, another passage in the plug extending from the cross passage to a peripheral termination adjacent the corresponding termination of the pocket-passage, and fixed conduits in communication with said terminations of the passages.

In testimony whereof I affix my signature.

JESSE D. TUCKER.